(12) United States Patent
Chen

(10) Patent No.: US 7,703,981 B2
(45) Date of Patent: Apr. 27, 2010

(54) LINEAR GUIDEWAY WITH A SYNCHRONOUS CONNECTOR

(75) Inventor: Tsung-Jen Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 518 days.

(21) Appl. No.: 11/734,246

(22) Filed: Apr. 11, 2007

(65) Prior Publication Data

US 2008/0253702 A1    Oct. 16, 2008

(51) Int. Cl.
     *F16C 29/06*      (2006.01)
(52) U.S. Cl. .......................................... 384/45; 384/51
(58) Field of Classification Search ............. 384/43–45, 384/51
See application file for complete search history.

(56) References Cited

U.S. PATENT DOCUMENTS

| 5,927,858 | A  | * | 7/1999 | Agari ........................... 384/45 |
| 6,779,419 | B2 | * | 8/2004 | Yamaguchi ................... 384/51 |
| 2006/0159373 | A1 | * | 7/2006 | Matsumoto .................... 384/45 |
| 2007/0201777 | A1 | * | 8/2007 | Wu et al. ....................... 384/51 |

\* cited by examiner

*Primary Examiner*—Thomas R Hannon
(74) *Attorney, Agent, or Firm*—Banger Shia

(57) ABSTRACT

A connector for a linear guideway is integrally formed by injection molding. The mold assembly of making the connector includes an upper mold, a lower mold and a pin. The variable cross section design of the pin enables the connector to have a plurality of ring-shaped portions with more than two different radial thicknesses, so that the distances between the respective rolling elements are different, and the frequencies of the respective rolling elements are also different, and as a result, the resonance sound pressure caused by the linear guideway and the machine are reduced. In addition, the variable cross section design of the pin reduces the manufacturing difficulty of making a relatively long connector.

8 Claims, 17 Drawing Sheets

LINEAR GUIDEWAY WITH A SYNCHRONOUS CONNECTOR

FIELD OF THE INVENTION

The present invention relates to a connector, and more particularly to a connector for enabling the rolling elements to be arranged non-equidistantly.

DESCRIPTION OF THE PRIOR ART

The rolling elements inside the linear guideway have the problem that they are likely to impact with each other and cause noise and unsmooth circulation. To solve this problem, the conventional method is to use a connector to separate the rolling element from one another with its spacer portions, and what follows is the description of the conventional connector.

Referring to FIGS. 1 and 2, a conventional connector 30 is a unitary structure disposed inside a linear guideway (not shown) and comprises a pair of elongated connecting portions 31 and a plurality of spacer portions 32 with a hollow structure 321. The connecting portions 31 serve to connect the respective spacer portions 32 together, and between each pair of neighboring spacer portions 32 is received a rolling element 1, so as to reduce the noise caused by the collision of the rolling elements and to achieve a smooth circulation. The connector 3 is formed by method of injection molding, and the mold assembly of making it includes an upper mold 21, a lower mold 22, and a pin 23. The pin 23 penetrates through the space between the upper and lower molds 21, 22 after the mold assembly is closed. The method of making the connector comprises the steps of: injecting material after the mold assembly is closed; retracting the pin 23 from the upper and lower molds 21, 22 after formation of the connector (the retracting direction is indicated by X); opening the upper mold 21 and pushing the connector 3 out of the mold cavity with the lower mold 22. However, the abovementioned method still has some disadvantages that need to be improved:

1. if the length of the connector increases, the length of the pin must be increased accordingly, and the problem is that, when retracting the pin from the mold assembly, sticking is likely to occur between the pin and the connector and make the formation difficult, relatively increasing the production difficulty.

2. the friction between the rolling elements and the surface of the rolling path is likely to cause noise, and the conventional connector makes the rolling elements spaced apart equidistantly, and as a result, the friction noises of the respective rolling elements will occur at the same frequency (as shown in FIG. 12). Therefore, when the linear guideway is assembled on a machine, a resonance is likely to occur and this will aggravate the noise problem.

The present invention has arisen to mitigate and/or obviate the afore-described disadvantages.

SUMMARY OF THE INVENTION

The primary objective of the present invention is to provide a connector that can enable the friction noises of the rolling elements of a linear guideway to be averagely distributed at different frequencies, thus reducing the resonance sound pressure caused by the linear guideway and the machine.

To achieve the abovementioned objective, the connector in accordance with the present invention comprises: a plurality of ring-shaped portions with more than two different radial thicknesses and an elongated connecting portion, each of the ring-shaped portions is formed between each two neighboring rolling elements, the elongated connecting portion is located outside the rolling elements for connecting the respective ring-shaped portions, so that the distances between the respective rolling elements (including rolling balls or roller) are different, and the frequencies of the respective rolling elements are also different, and as a result, the resonance sound pressure caused by the linear guideway and the machine are reduced.

Another objective of the present invention is to reduce the difficulty of making a relatively long connector.

To achieve the abovementioned objective, the connector in accordance with the present invention is integrally formed by injection molding. The mold assembly of making the connector includes an upper mold, a lower mold and a pin. The pin penetrates a mold cavity between the upper and lower molds. And the method of making the connector comprises the steps of: fixing the pin in the lower mold, then closing the upper and lower molds; injecting material; forming the connector; retracting the pin from the mold cavity between the upper and lower molds, and then opening the upper mold and pushing the connector out of the mold cavity with the lower mold. To reduce the interference force between the pin and the connector when retracting the pin from the mold assembly, the pin is designed to be variable in cross section (the diameter of the cross section gradually increases or decreases outward or inward). By such arrangements, the manufacturing difficulty of making a relatively long connector can be reduced.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
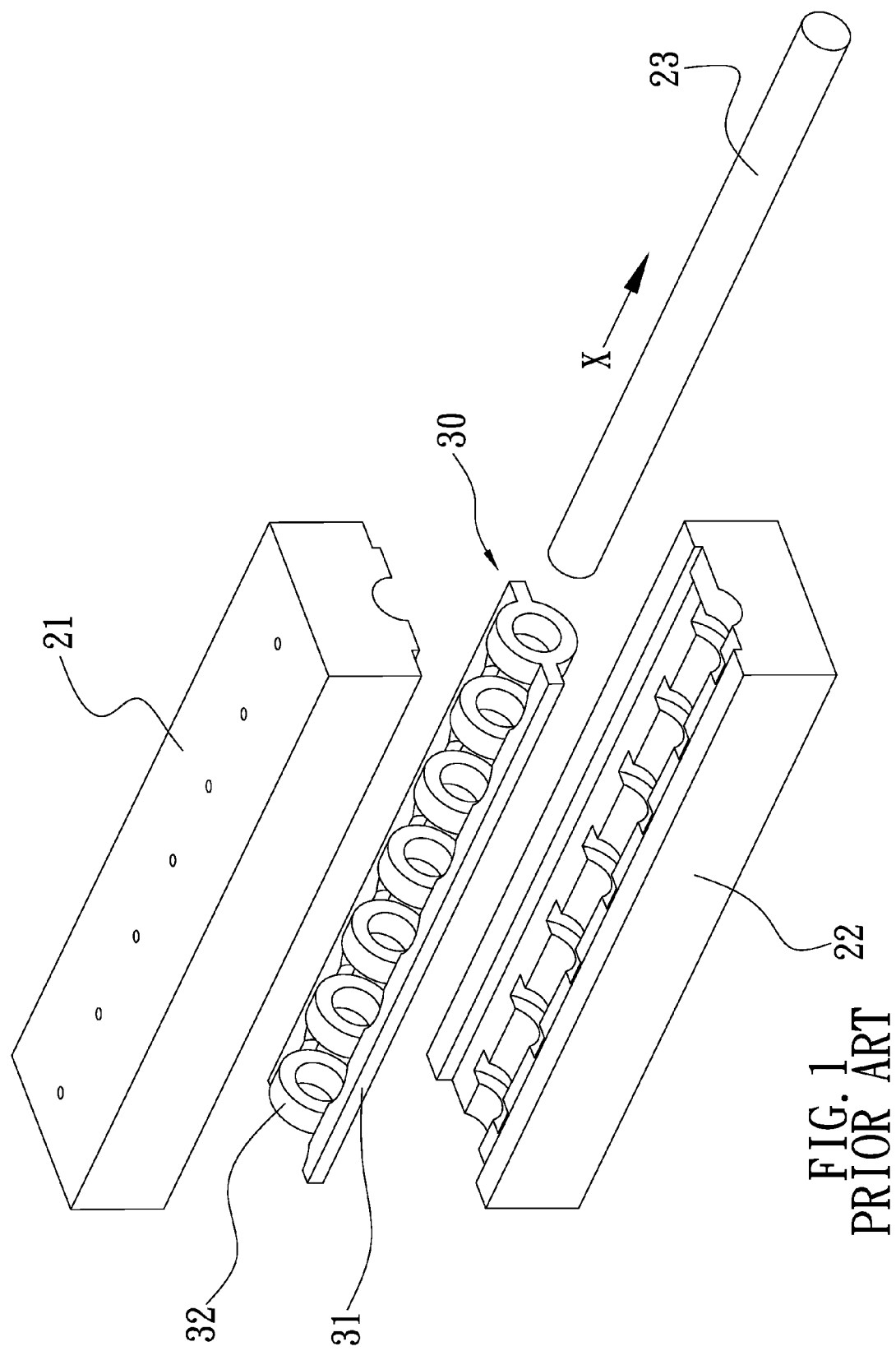
FIG. 1 is a perspective view of showing the mold release operation for making a conventional connector.
Figure 2:
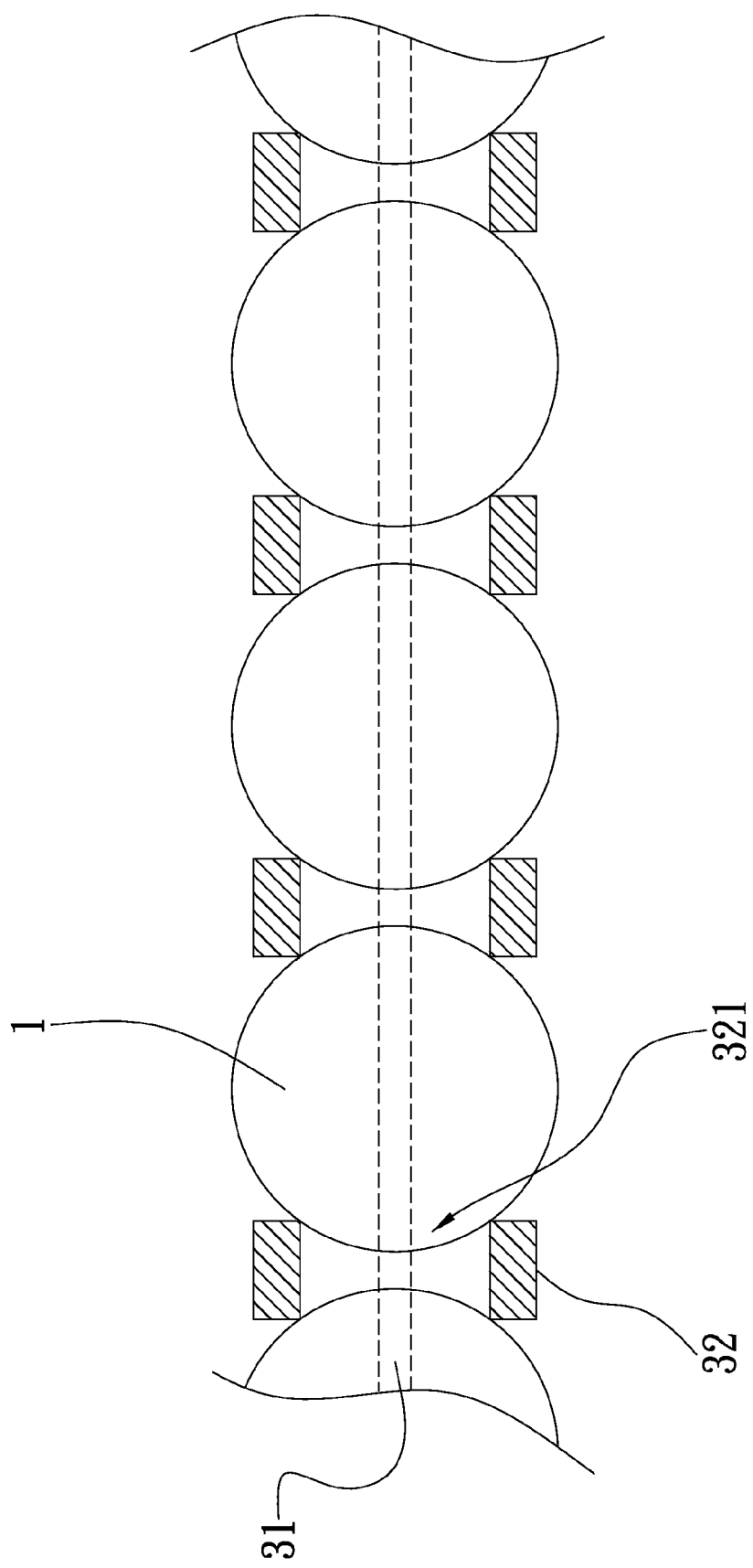
FIG. 2 is a cross sectional view of showing a conventional connected being assembled with rolling elements.
Figure 3:
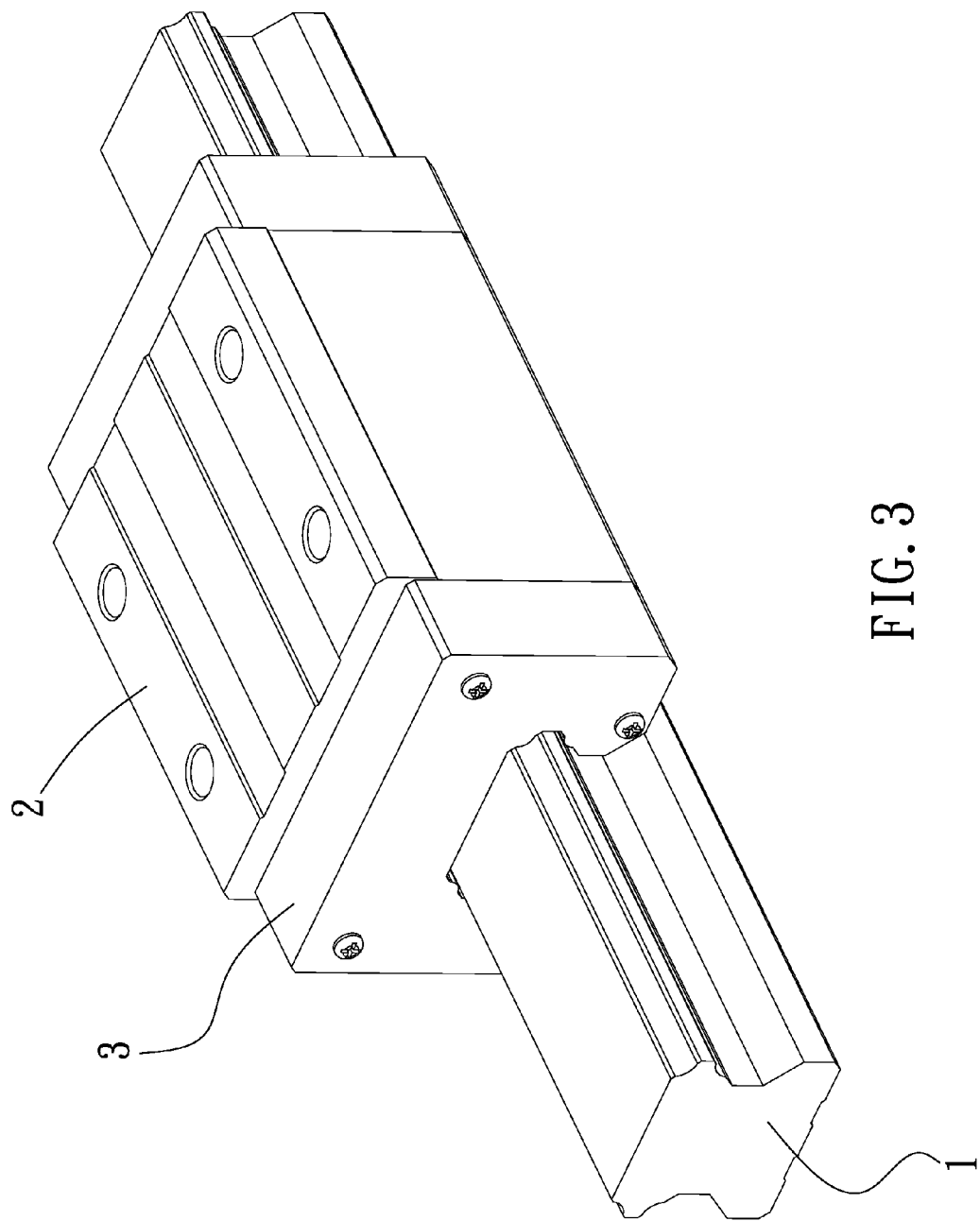
FIG. 3 is a perspective view of a linear guideway in accordance with the present invention.
Figure 4:
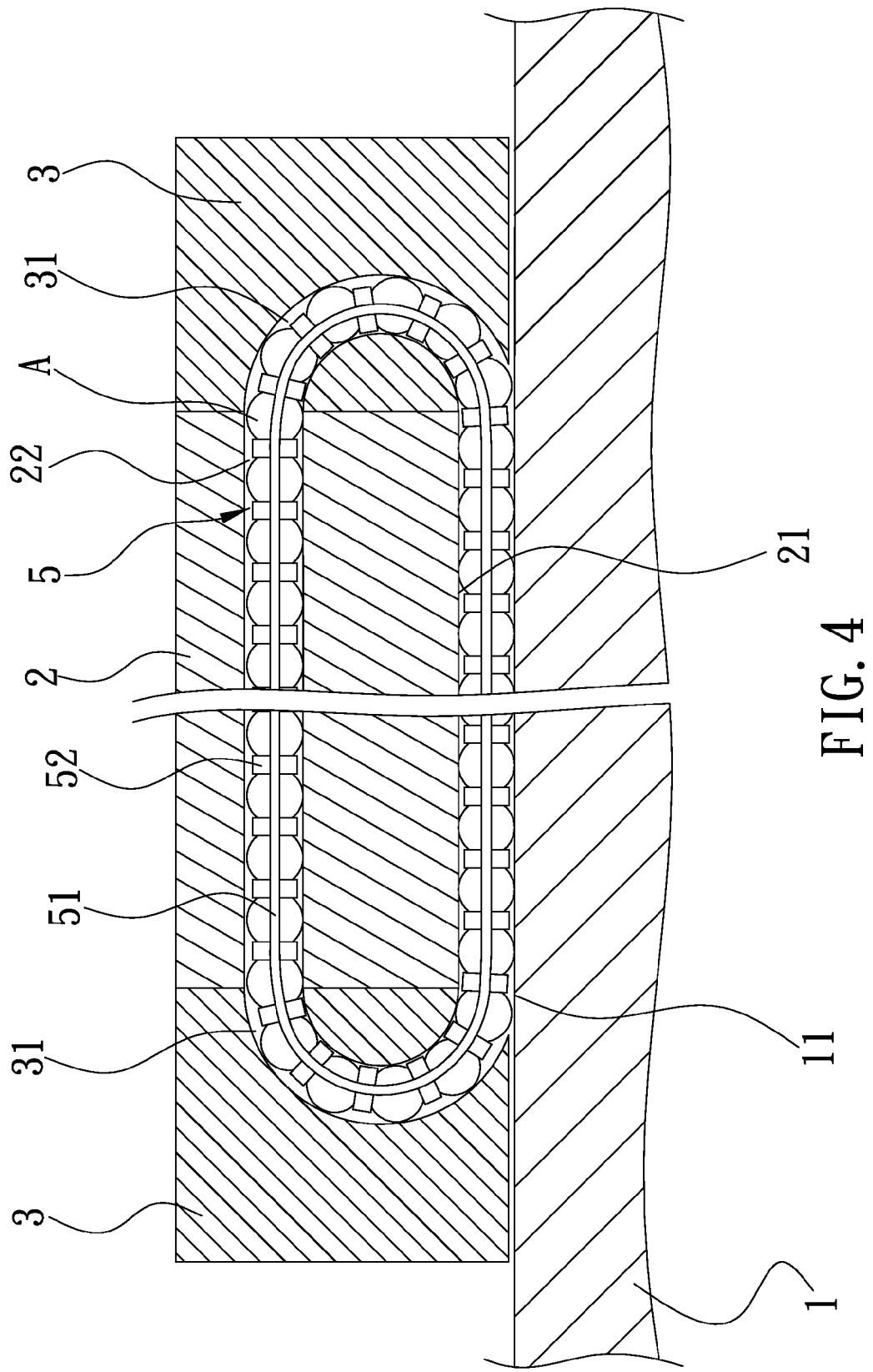
FIG. 4 is a cross sectional view of showing a circulation path of the linear guideway in accordance with the present invention.
Figure 11:
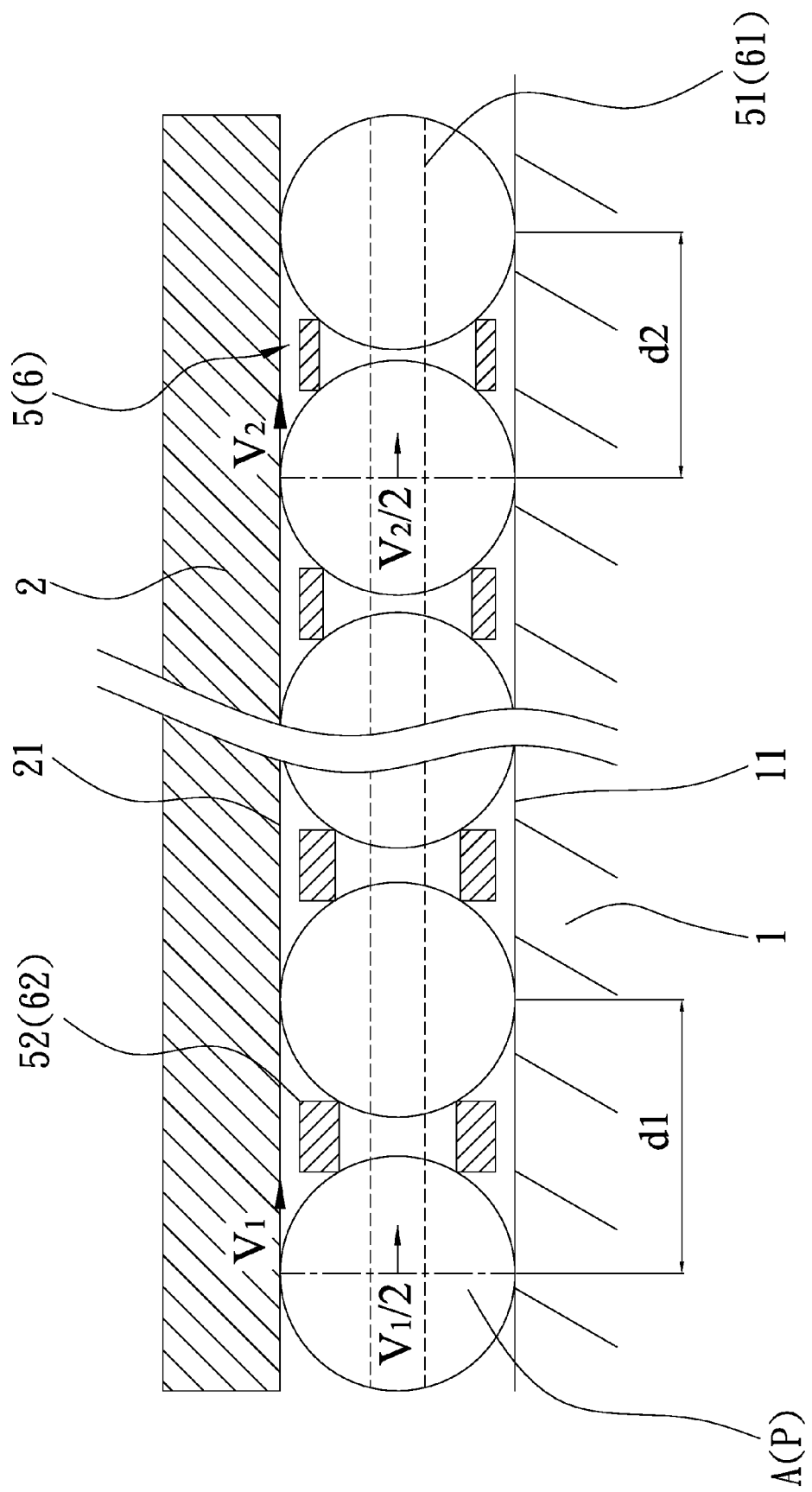
FIG. 11 is a cross sectional view of showing the connector in accordance with the present invention.

Referring to FIGS. 3, 4 and 11, a linear guideway with non-equidistant connector in accordance with the present invention comprises: a rail 1, a sliding block 2, a plurality of rolling elements, and two end caps 3.

The rail 1 is provided with two rolling grooves 11 at both sides thereof.

The sliding block 2 is reverse U-shaped and is slideably mounted on the rail 1 to perform reciprocating motion thereon. In the inner surfaces of the sliding block 2 are formed two grooves 21 for cooperating with the rolling grooves 11 of the rail 1, and at both sides of the sliding block 2 are further formed axial through holes 22.

The rolling elements are rolling balls A or rollers P.

The end caps 3 are disposed at both ends of the sliding block 2 and each of which is formed with a circulation passage 31.

The circulation passage 31, the grooves 11 and the rolling grooves 21 cooperate with the through holes 22 to form a circulation path (as shown in FIG. 4). The rolling elements A, P are received in the circulation path and restricted in the connectors 5 and 6. Each of the connectors 5 and 6 includes a plurality of ring-shaped portions 52, 62 with more than two different radial thicknesses and an elongated connecting portion 51, 61 located outside the rolling elements A, P for connecting the respective ring-shaped portions 52, 62. Each of the ring-shaped portions 52, 62 is formed between each two neighboring rolling elements A, P, and the ring-shaped portions 52, 62 are in a line-to-line contact with the rolling elements A, P, thus preventing the neighboring rolling elements A, P from impacting each other and accordingly reducing the impact-caused noise. However, the movement of the rolling elements A, P relative to the surface of the rolling path (including the surfaces of the grooves 11 and the rolling grooves 21) is achieved through rolling friction, which will inevitably cause friction noise, and the frequency of the resultant friction noise is calculated as follows:

1. the time for the center of the rolling element A, P to cross a neighboring rolling element A, P is: T=2d/v 2. the frequency at which the rolling element A, P crosses a neighboring rolling element A, P (frequency of the friction noise; the frequency is the reciprocal of the time), f=v/2d.

from the abovementioned relations, we found that, when the distances between the respective rolling elements A, P are different (d1≠d2), as shown in FIG. 11, the frequencies of the respective rolling elements A, P are also different (f1≠f2).

Figure 12:
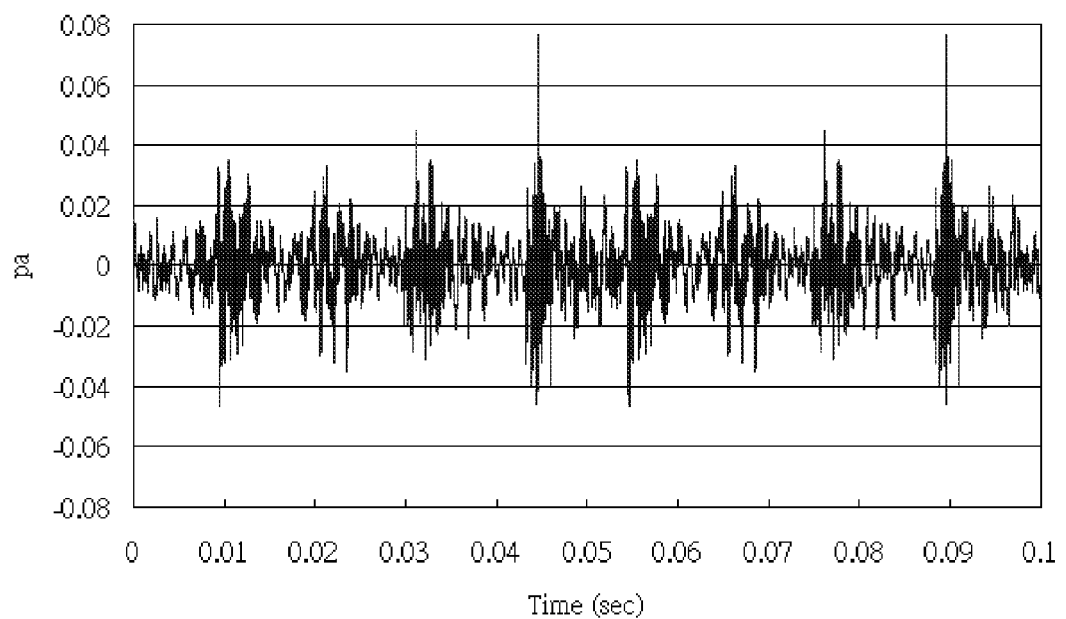
FIG. 12 shows the noise measurement signals of an equidistant connector.
Figure 13:
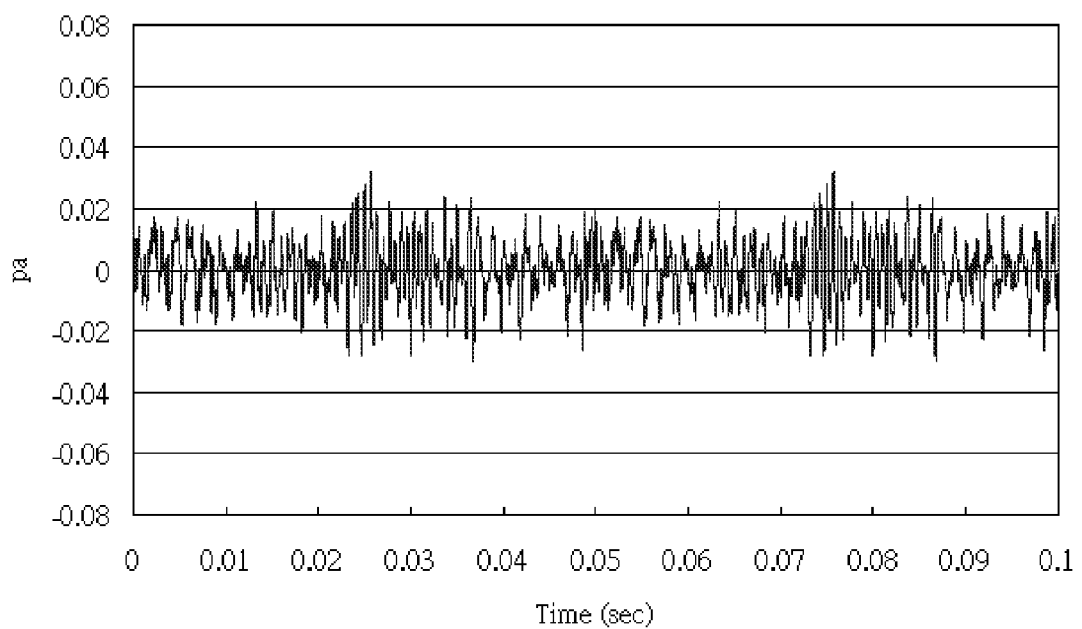
FIG. 13 shows the noise measurement signals of a non-equidistant connector.

Each of the connectors 5 and 6 in accordance with the present invention includes a plurality of ring-shaped portions 52, 62 with more than two different radial thicknesses (the thickness of the ring-shaped portions 52, 62 thins from one end toward the other end thereof, or it can also thin from the center toward both ends thereof), so that the distances between the respective rolling elements A, P are different, and the frequencies of the respective rolling elements A, P are also different (as shown in FIG. 13, which shows the noise measurement signals of the non-equidistant connector, as compared with FIG. 12, the friction noises of the non-equidistant connector have been evenly distributed to different frequencies), and as a result, the resonance sound pressure caused by the linear guideway and the machine will be reduced.

The design theory of even distribution of the friction noises to different frequencies and the structure of the connector are described as above, and what follows is the description of the method of making the connectors 5 and 6.

Figure 5A:
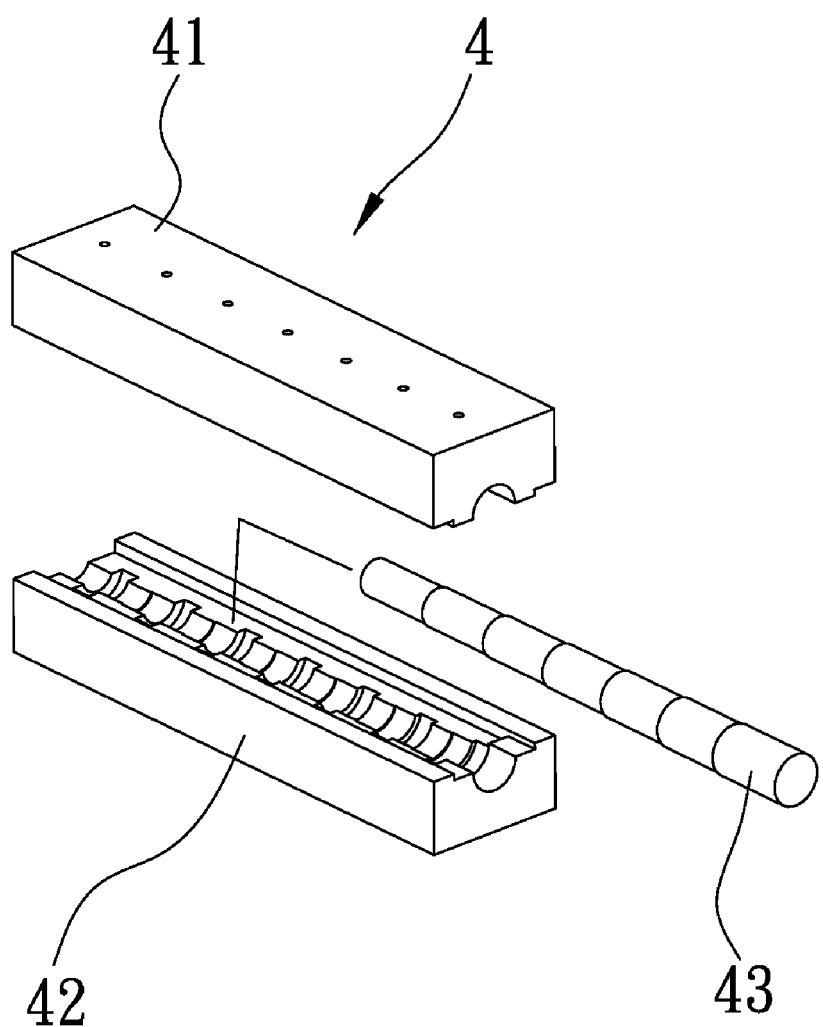
FIG. 5A is a perspective view of showing the connector manufacturing process in accordance with the present invention (exploded view of the mold assembly)
Figure 5B:
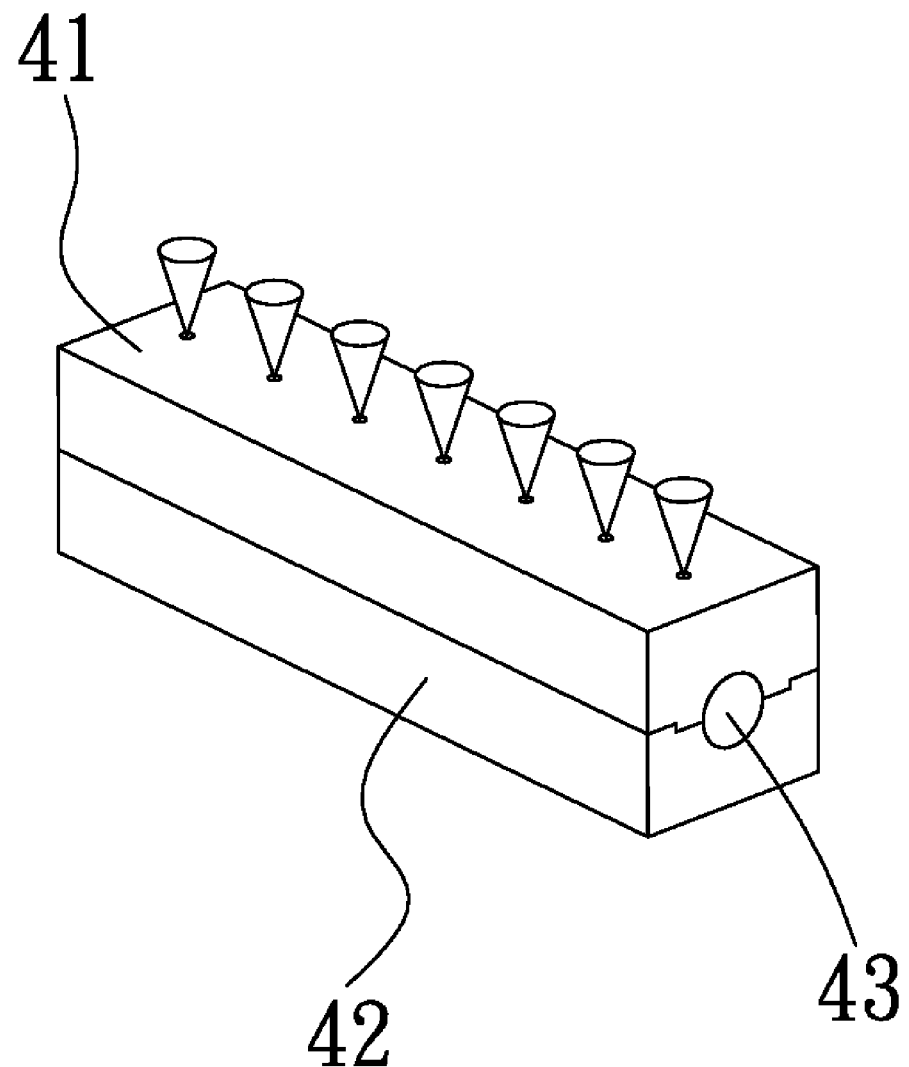
FIG. 5B is a perspective view of showing the connector manufacturing process in accordance with the present invention (injecting material)
Figure 5C:
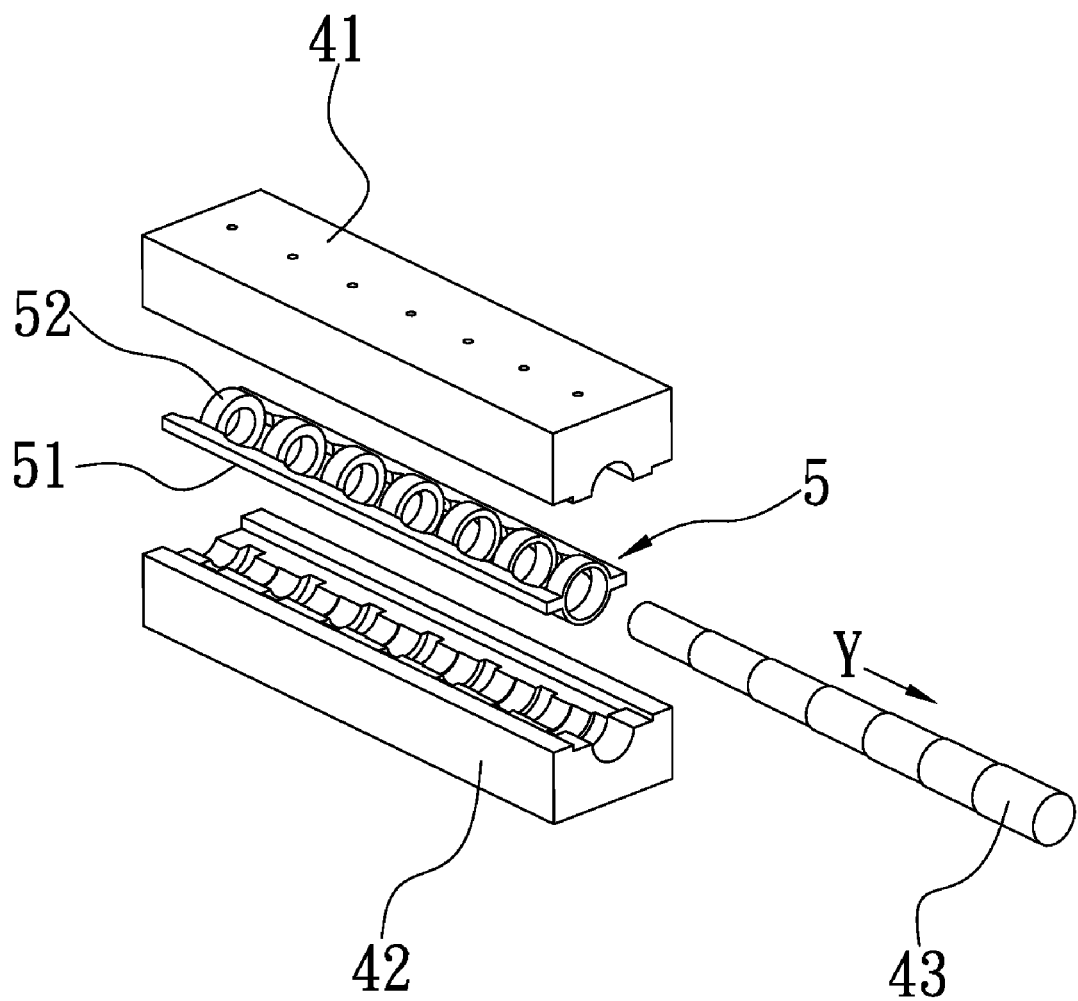
FIG. 5C is a perspective view of showing the connector manufacturing process in accordance with the present invention (mold release)

Referring to FIGS. 5A-5C, 6, 7, 8A and 8B, a first embodiment of the present invention is the connector 5 for rolling balls A, which comprises an elongated connecting portion 51 and a plurality of ring-shaped portions 52. Each of the ring-shaped portions 52 has a circular shape. The connector 5 is integrally formed by injection molding. The mold assembly 4 of making the connector includes an upper mold 41, a lower mold 42 and a pin 43. The pin 43 penetrates a mold cavity between the upper and lower molds 41, 42. And the method of making the connector comprises the steps of: fixing the pin 43 in the lower mold 42, then closing the upper and lower molds 41, 42 (as shown in FIG. 5A); injecting material (as shown in FIG. 5B); forming the connector 5; retracting the pin 43 from the mold cavity between the upper and lower molds 41, 42 (Y indicates the retracting direction, and then opening the upper mold 41 and pushing the connector 5 out of the mold cavity with the lower mold 42 (as shown in FIG. 5). Therefore, the connector 5 with ring-shaped portions 52 is produced.

Figure 6:
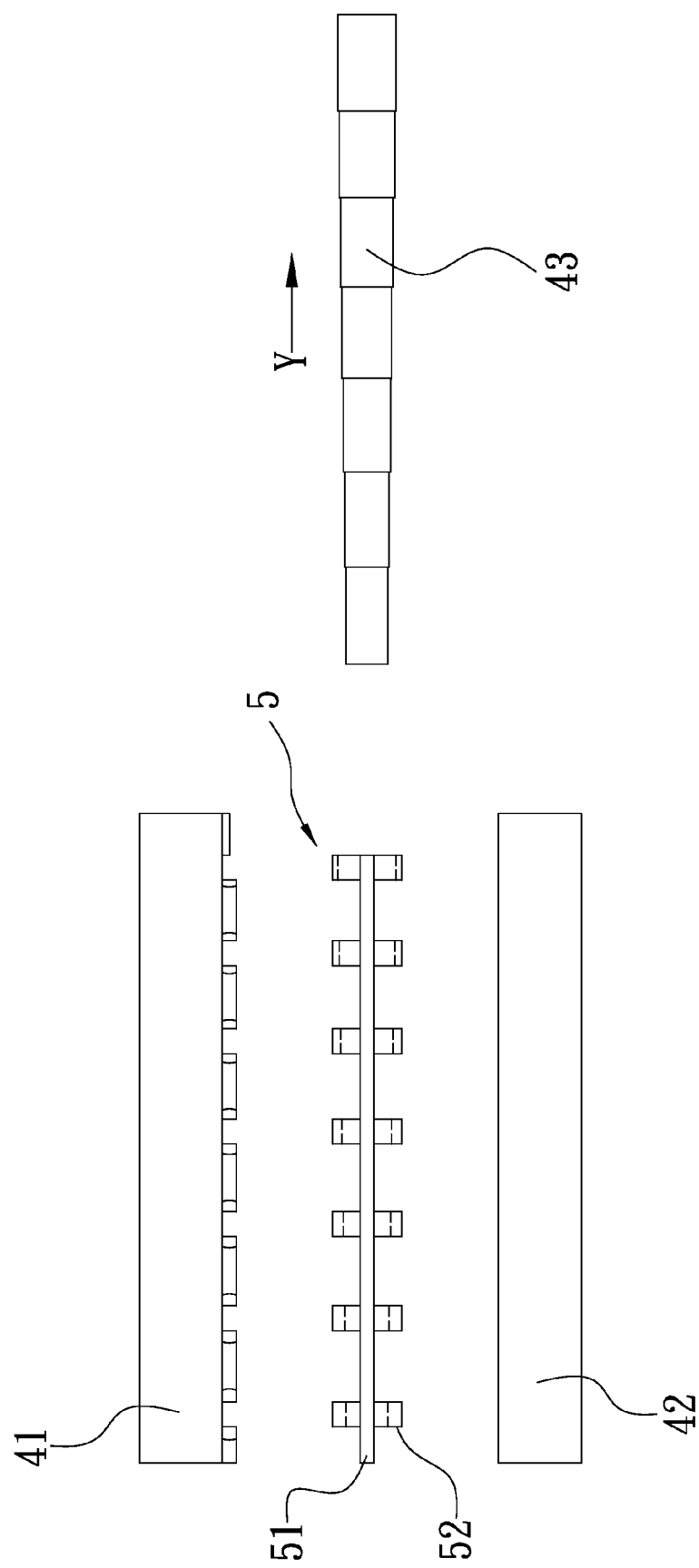
FIG. 6 is a perspective of showing the connector manufacturing process in accordance with a first embodiment of the present invention, wherein the pin formed is a stepped rod.
Figure 7:
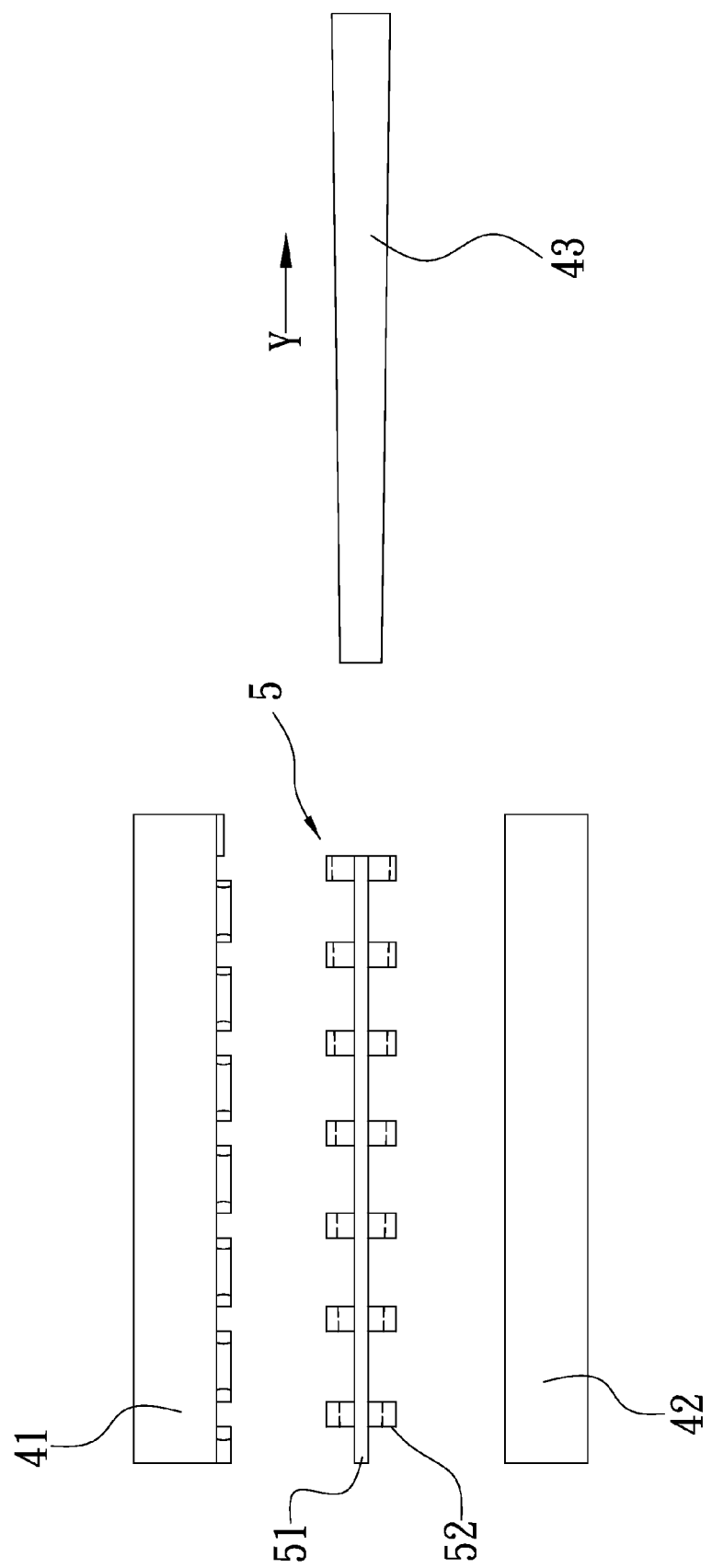
FIG. 7 is a perspective of showing the connector manufacturing process in accordance with a first embodiment of the present invention, wherein the pin formed is a truncated cone s-shaped rod.

The mold assembly is characterized in that the pin 43 is of variable cross section design, and the pin 43 can be a stepped pin (as shown in FIG. 6) or a truncated cone-shaped pin (as shown in FIG. 7). Any variations of the pin 43 would be within the scope of the present invention, as long as it has the variable cross section. The variable cross section design has the following advantages:

1. when the connector 5 of the rolling balls A is comparatively long, the variable cross section design can reduce the interference force between the pin 43 and the connector 5 when retracting the pin 43 from the mold assembly, and thus the connector can be produced quickly and easily.

Figure 8A:
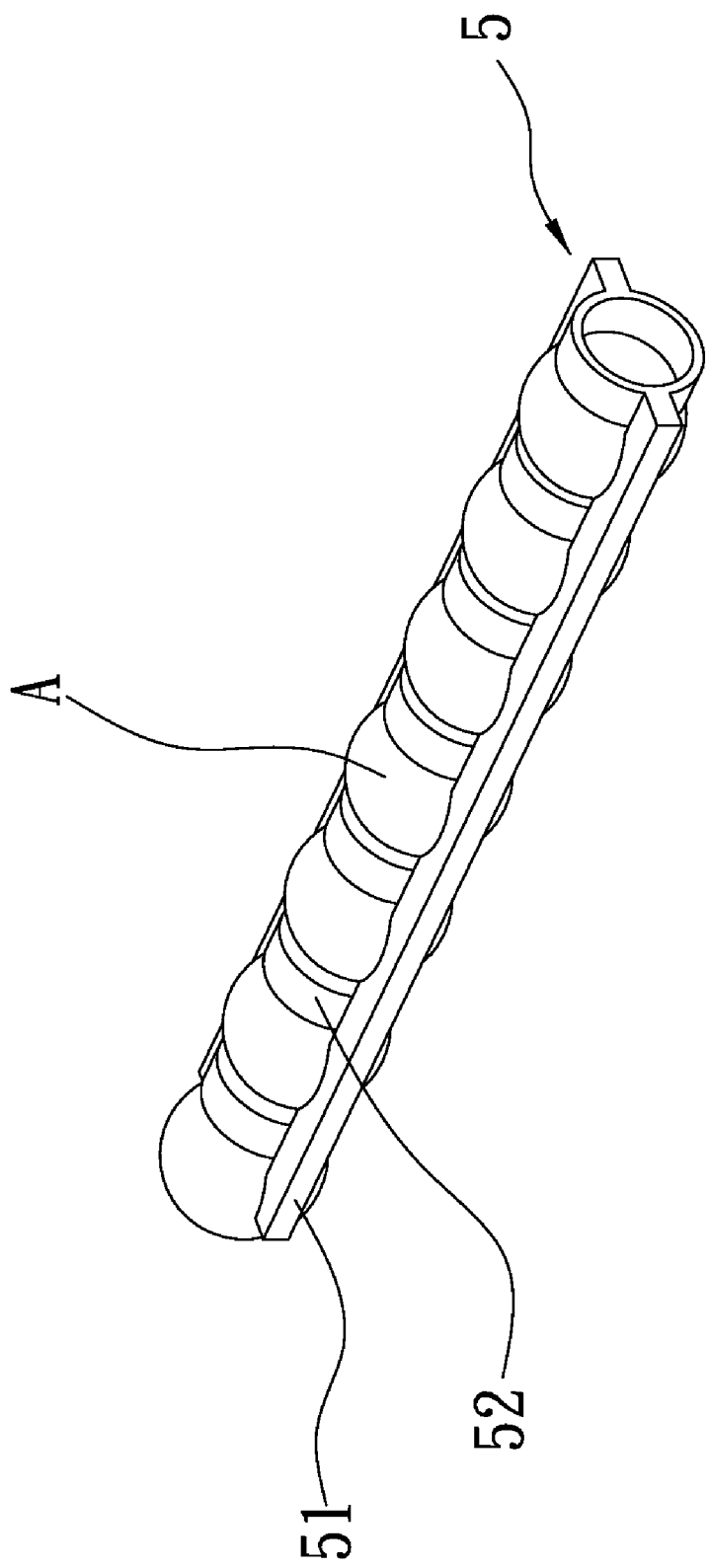
FIG. 8A is a perspective view of a rolling ball connector in accordance with the first embodiment of the present invention.
Figure 8B:
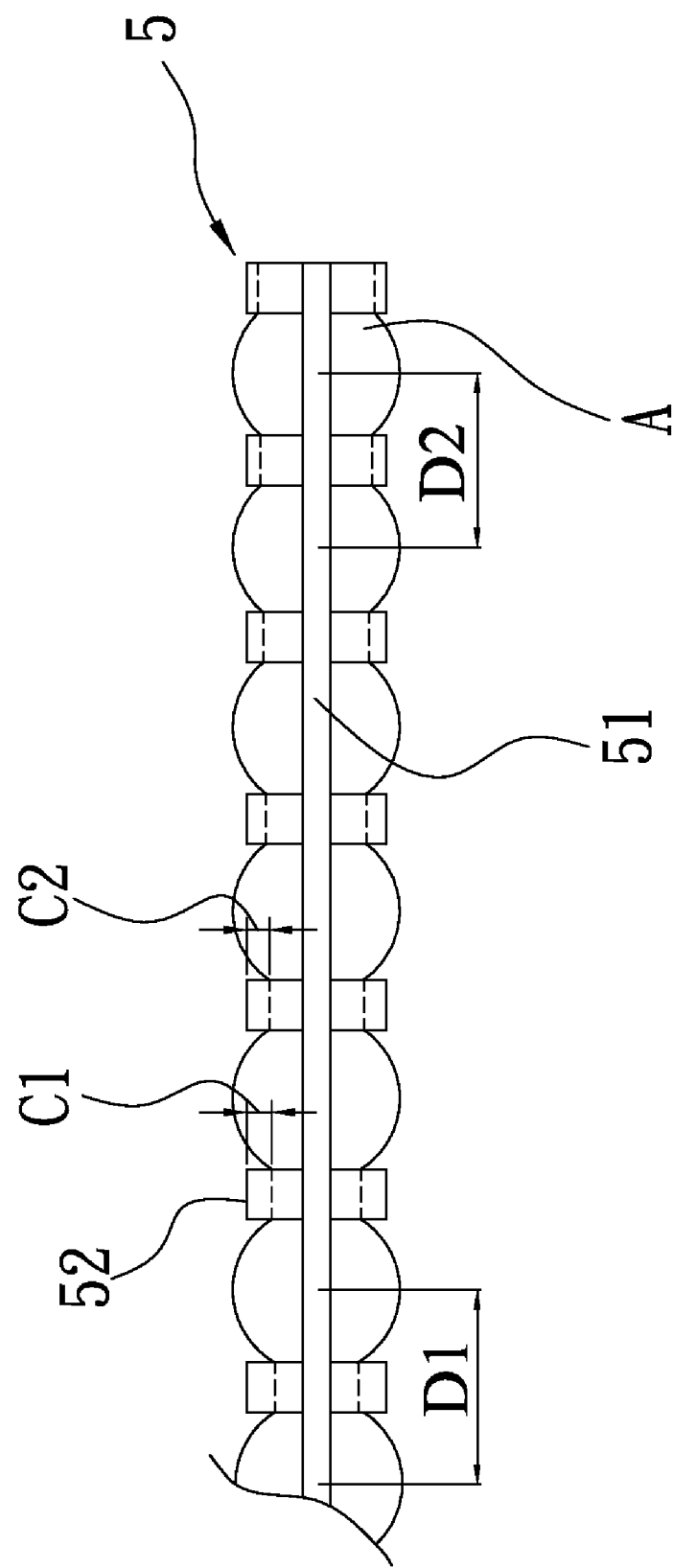
FIG. 8B is a side view of the rolling ball connector in accordance with the first embodiment of the present invention.

2. the variable cross section deign of the pin 43 enables the connector 5 to have the ring-shaped portions 52 with more than two different radial thicknesses (C1≠C2), so that the distances between the respective rolling elements A, P are different (D1≠D2), as shown in FIGS. 8A and 8B, and the friction noises of the non-equidistant connector are evenly distributed to different frequencies, and as a result, the resonance sound pressure caused by the linear guideway and the machine will be reduced.

Figure 9:
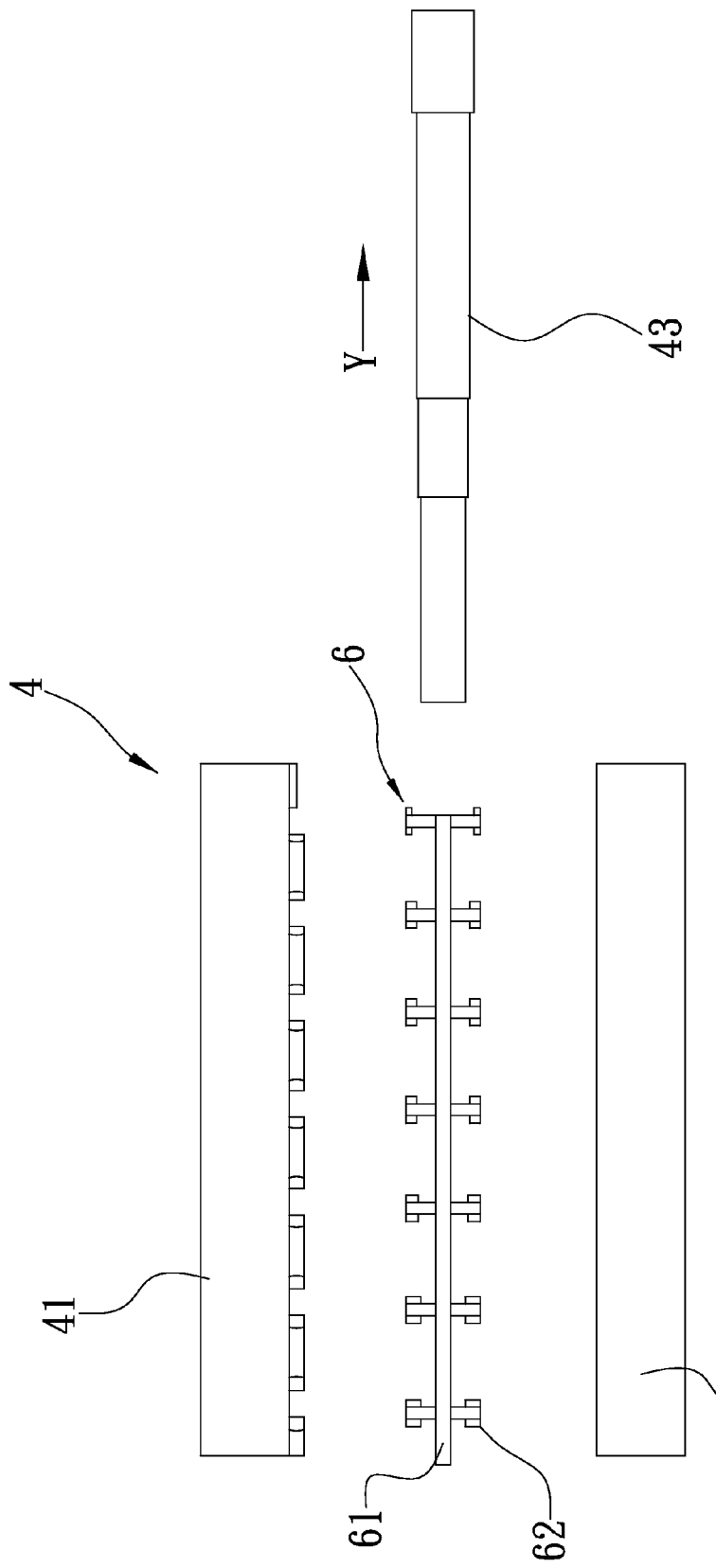
FIG. 9 is a perspective of showing the mold release operation in accordance with a second embodiment of the present invention.
Figure 10A:
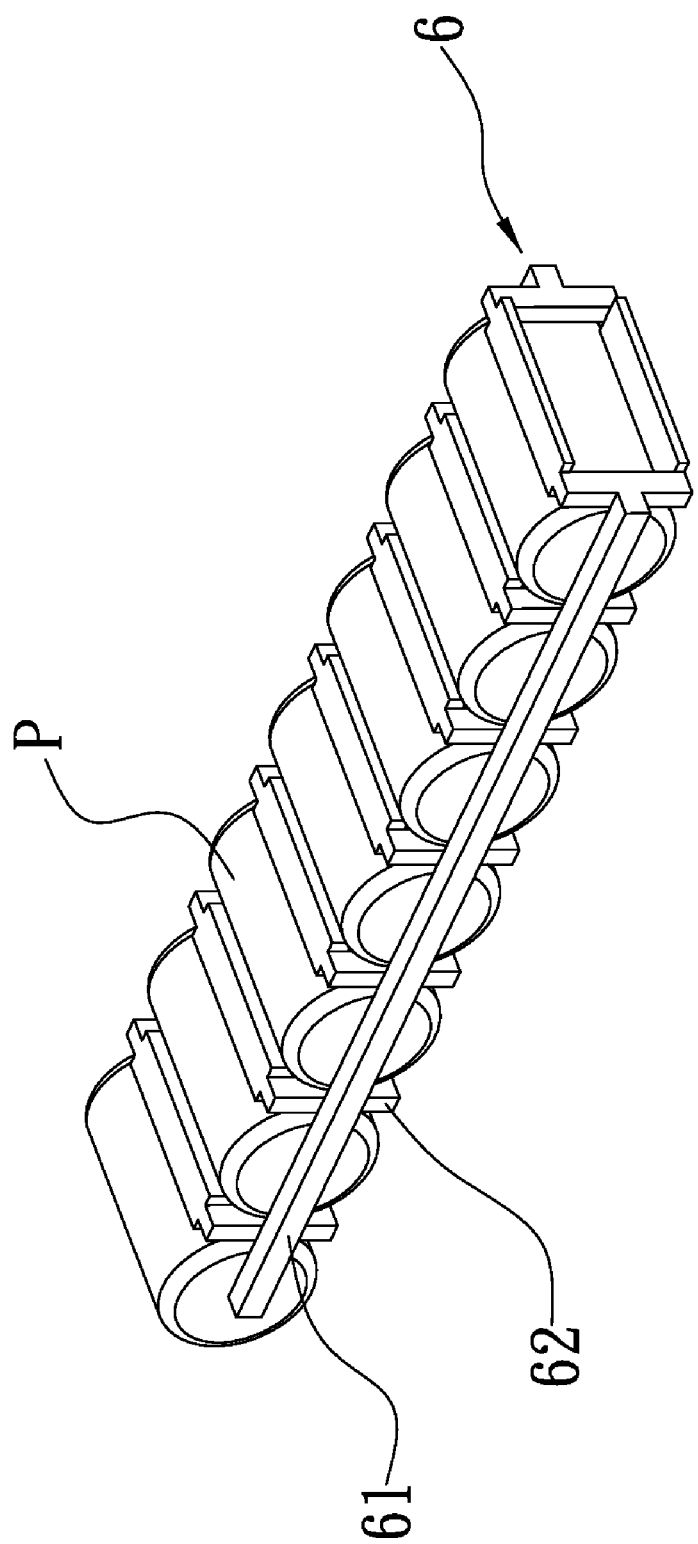
FIG. 10A is a perspective view of a roller connector in accordance with the second embodiment of the present invention.
Figure 10B:
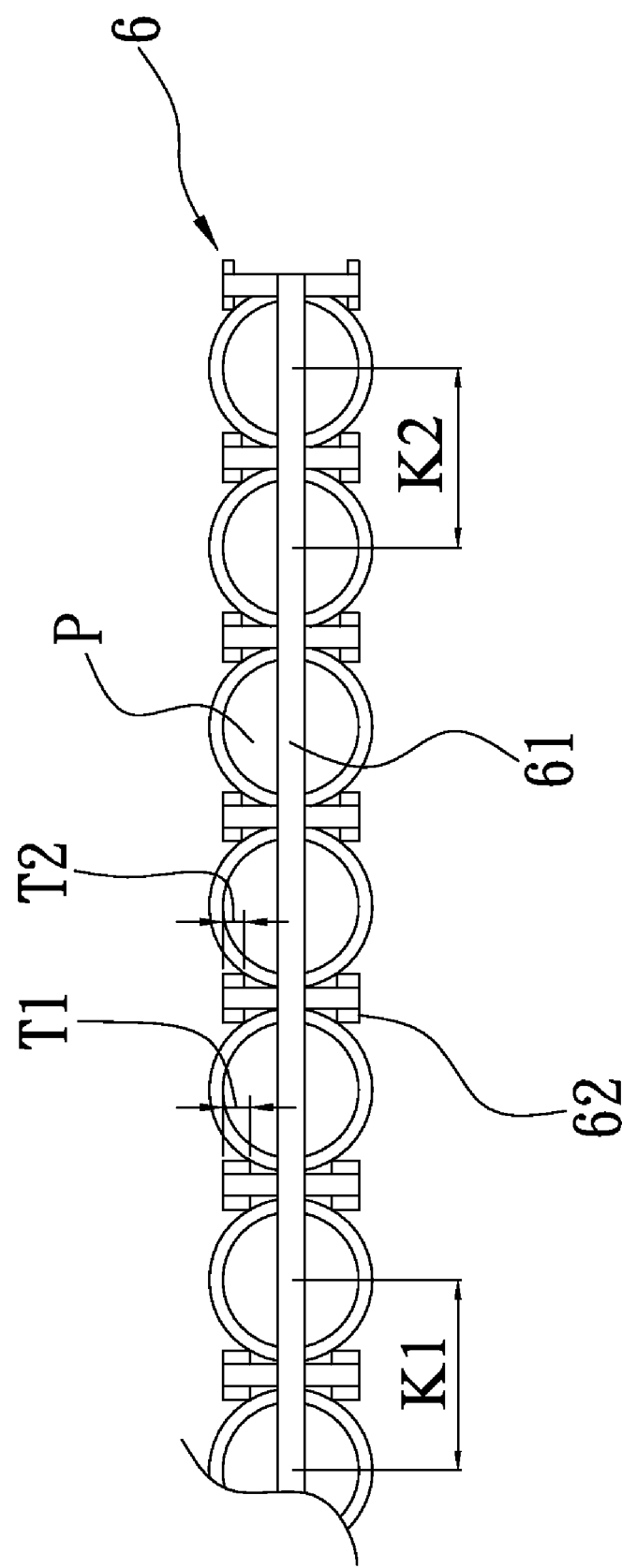
FIG. 10B is a side view of the roller connector in accordance with the second embodiment of the present invention.

FIGS. 9, 10A, and 10B show another embodiment of the present invention, the connector making method can also be used to make the connector 6 for the rollers P. The connector 6 for rollers P comprises an elongated connecting portion 61 and a plurality of ring-shaped portions 62, and the ring-shaped portions 62 each has a rectangular shape. The variable cross section design of the pin 43 enables the connector 6 to have the ring-shaped portions 62 with more than two different radial thicknesses (T1≠T2), so that the distances between the respective rolling elements A, P are different (K1≠K2), as shown in FIGS. 10A and 10B, and thus achieving the same functions as the first embodiment, further descriptions are omitted.

To summarize, the present invention relates to a linear guideway with synchronous connector, with the design of the mold structure, the connector comprises a plurality of ring-shaped portions with more than two different radial thicknesses, so that the distances between the respective rolling elements are different, and the frequencies of the respective rolling elements are also different, and as a result, the resonance sound pressure caused by the linear guideway and the machine are reduced. In addition, with the design of the mold structure, the connector can be produced easily and quickly.

While we have shown and described various embodiments in accordance with the present invention, it is clear to those skilled in the art that further embodiments may be made without departing from the scope of the present invention.

What is claimed is:

1. A linear guideway with a synchronous connector comprising:
    a rail formed at both sides thereof with rolling grooves;
    a reverse U-shaped sliding block being slideably mounted on the rail to perform reciprocating motion thereon, in inner surfaces of the sliding block being formed grooves for cooperating with the rolling grooves of the rail, and the sliding block being further formed with axial through holes;
    a plurality of rolling elements;
    two end caps disposed at both ends of the sliding block, and each end cap being formed with a circulation passage; the circulation passage, the grooves and the rolling grooves cooperating with the through holes to form a circulation path, the rolling elements being received in the circulation path and restricted in the connector;
    the linear guideway with a synchronous connector is characterized in that: the connector includes a plurality of ring-shaped portions with more than two different radial thicknesses and an elongated connecting portion, each of the ring-shaped portions is formed between each two neighboring rolling elements, the elongated connecting portion is located outside the rolling elements for connecting the respective ring-shaped portions.

2. The linear guideway with a synchronous connector as claimed in claim 1, wherein the ring-shaped portions are in a line-to-line contact with the rolling elements.

3. The linear guideway with a synchronous connector as claimed in claim 2, wherein the rolling elements are rolling balls, and the ring-shaped portions are circular in shape.

4. The linear guideway with a synchronous connector as claimed in claim 2, wherein the rolling elements are rollers, and the ring-shaped portions are rectangular in shape.

5. The linear guideway with a synchronous connector as claimed in claim 1, wherein the rolling elements are rolling balls, and the ring-shaped portions are circular in shape.

6. The linear guideway with a synchronous connector as claimed in claim 1, wherein the rolling elements are rollers, and the ring-shaped portions are rectangular in shape.

7. The linear guideway with a synchronous connector as claimed in claim 1, wherein a radial thickness of each of the ring-shaped portions thins from one end toward the other end thereof.

8. The linear guideway with a synchronous connector as claimed in claim 1, wherein a radial thickness of each of the ring-shaped portions thins from the center toward both ends thereof.

* * * * *